(12) United States Patent
Connelly et al.

(10) Patent No.: US 9,059,840 B2
(45) Date of Patent: Jun. 16, 2015

(54) RECIPIENT BLIND CRYPTOGRAPHIC ACCESS CONTROL FOR PUBLICLY HOSTED MESSAGE AND DATA STREAMS

(75) Inventors: Jeffrey A. Connelly, San Jose, CA (US); David M. O'Rourke, San Jose, CA (US); Matthew M. Patenaude, Pawtucket, RI (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/485,692

(22) Filed: May 31, 2012

(65) Prior Publication Data

US 2013/0326220 A1    Dec. 5, 2013

(51) Int. Cl.
G06F 21/60 (2013.01)
H04L 9/32 (2006.01)
H04L 9/08 (2006.01)
H04L 9/14 (2006.01)
H04L 29/06 (2006.01)

(52) U.S. Cl.
CPC .............. *H04L 9/0825* (2013.01); *G06F 21/60* (2013.01); *H04L 9/14* (2013.01); *H04L 9/3226* (2013.01); *H04L 63/045* (2013.01); *H04L 63/101* (2013.01)

(58) Field of Classification Search
CPC ...................................................... G06F 21/60
USPC ......................................................... 713/168
See application file for complete search history.

(56) References Cited

U.S. PATENT DOCUMENTS

| | | | |
|---|---|---|---|
| 5,748,735 A * | 5/1998 | Ganesan | 713/165 |
| 6,185,684 B1 * | 2/2001 | Pravetz et al. | 713/182 |
| 6,428,282 B1 | 8/2002 | Langley | |
| 7,138,781 B2 | 11/2006 | Murray et al. | |
| 7,178,021 B1 * | 2/2007 | Hanna et al. | 713/155 |
| 7,596,692 B2 * | 9/2009 | Fox et al. | 713/155 |
| 7,660,987 B2 * | 2/2010 | Baylis et al. | 713/168 |
| 7,661,316 B2 | 2/2010 | Gross et al. | |
| 7,711,452 B2 | 5/2010 | Konstadinidis et al. | |
| 7,761,244 B2 | 7/2010 | Gross et al. | |
| 8,166,565 B1 * | 4/2012 | Tormasov et al. | 726/27 |
| 8,281,125 B1 * | 10/2012 | Briceno et al. | 713/153 |
| 8,336,105 B2 * | 12/2012 | Hartung et al. | 726/27 |
| 2005/0198170 A1 * | 9/2005 | LeMay et al. | 709/206 |
| 2005/0283826 A1 * | 12/2005 | Tahan | 726/2 |
| 2006/0101507 A1 * | 5/2006 | Camenisch | 726/5 |
| 2006/0239452 A1 * | 10/2006 | Jung et al. | 380/44 |
| 2007/0269041 A1 * | 11/2007 | Bhatnagar et al. | 380/30 |
| 2008/0028224 A1 * | 1/2008 | Pitsos | 713/178 |
| 2008/0120504 A1 * | 5/2008 | Kirkup et al. | 713/176 |
| 2008/0123850 A1 * | 5/2008 | Bhatnagar et al. | 380/259 |
| 2009/0307490 A1 * | 12/2009 | Dancer | 713/168 |
| 2011/0179288 A1 * | 7/2011 | Catrein et al. | 713/189 |
| 2012/0086971 A1 * | 4/2012 | Bisbee et al. | 358/1.14 |

* cited by examiner

*Primary Examiner* — Dede Zecher
*Assistant Examiner* — Jason C Chiang
(74) *Attorney, Agent, or Firm* — Blakely, Sokoloff, Taylor & Zafman LLP

(57) ABSTRACT

Private message system, method, and apparatus are described. A private message that includes encrypted data and identifying information indicating a recipient client device authorized to read the private message is stored at a server computer. Since the client devices perform all encryption and decryption processing, the server computer stores the private message in a platform agnostic manner and without performing any encryption/decryption related processes. Although any number of recipient devices can receive the private message, only a recipient client device authorized in accordance with the identifying information can read the private message.

18 Claims, 11 Drawing Sheets

RECIPIENT BLIND CRYPTOGRAPHIC ACCESS CONTROL FOR PUBLICLY HOSTED MESSAGE AND DATA STREAMS

TECHNICAL FIELD

The described embodiments generally relate to methods and apparatuses for encryption in a cloud based environment. In particular, privacy between client devices is controlled by client side processing with little or no server side processing providing a platform agnostic server.

BACKGROUND

Cloud computing is a technology that uses the internet and central remote servers to maintain data and applications to provide any number of cloud based services such as data storage, application, and computing. Cloud computing allows consumers and businesses to use applications without installation and access their personal files at any computer with internet access allowing for much more efficient computing by centralizing storage, memory, processing and bandwidth. With cloud-based services becoming increasingly popular, maintaining privacy without sacrificing system performance is more important than ever. Achieving scalability with increasingly complex server software is also challenging, and the more of the burden of privacy control that is placed on the server side, the greater the degradation of the performance of the system as a whole. Since many client devices accessing web services today have access to comparatively large amount of processing resources, it would be desirable to be able to use this client based processing resource to offload from the central servers to the individual client devices most if not all of the potentially complex computations required involved in privacy control.

Therefore, what is desired is a client side system that utilizes client device processing resources to effectuate privacy control in a cloud based environment requiring little or no server computational resources.

SUMMARY OF THE DESCRIBED EMBODIMENTS

In one embodiment, a private communication method is described. The method can be carried out by storing at least an encrypted data portion of a private message at a server, the encrypted data portion encrypted at an authoring client device. The private message also includes information identifying a client device authorized to read the private message. At least the encrypted data portion of the private message is sent from the server to a recipient client device that performs all decryption processing required to read the encrypted data portion only if the recipient client device is authorized to read the private message in accordance with the identifying information. In this way, the server stores at least the encrypted data portion of the private message in a platform agnostic manner and without performing any encryption or decryption related processing.

In another embodiment, a multi-mode communication device is described. The communication device includes at least a communication interface arranged to send and receive information and a processor coupled with the communication interface, the processor arranged to control a secure messaging service at the communication device. The processor controls the secure messaging service by creating a first secure message that includes at least a first secure data portion encrypted with a first symmetric encryption key and first authorized recipient device information. The first authorized recipient device information includes at least a first group label bound to a first access control list that includes the first symmetric encryption key encrypted with a public key of a first authorized recipient device. The processor acts to further use the communication interface to post at least the first secure data portion to an external data storage device. A recipient device receives the first secure message and performs all decryption processing required to read the secure message only if the recipient device is authorized in accordance with the authorized recipient device information. In this way, the external data storage device stores the at least the encrypted data portion in a platform agnostic manner and without performing any encryption and decryption processing.

In yet another embodiment, a method performed by a multi-mode portable communication device having a processor and a communication interface is described. The method is carried out by creating a secure message that includes at least a secure data portion encrypted by a symmetric encryption key, and authorization information used by a recipient device to determine if the recipient device is authorized to read the secure message. At least the encrypted data portion of the secure message is posted to an external data storage device using the communication interface. The recipient device receives at least the encrypted data portion and only if authorized in accordance with the authorization information, performs substantially all decryption processing required to read the encrypted data portion. In this way, the external data storage device stores the first secure message in a platform agnostic manner and without performing any encryption and decryption processing.

In still another embodiment, non-transitory computer readable medium for storing computer code executable by a processor storing computer code executable by a processor includes computer code for storing at least an encrypted data portion of a private message at a server, the encrypted data portion encrypted at an authoring client device. The private message also including information identifying a recipient client device authorized to read the private message. The computer readable medium also includes computer code for sending at least the encrypted data portion of the private message from the server to a client device. The receiving client device performs all decryption processing required to read the encrypted data portion only if the receiving client device is authorized to read the private message in accordance with the identifying information such that the server store at least the encrypted data portion in a platform agnostic manner and without performing any encryption or decryption related processing.

BRIEF DESCRIPTION OF THE DRAWINGS

The described embodiments and the advantages thereof may best be understood by reference to the following description taken in conjunction with the accompanying drawings.

DETAILED DESCRIPTION OF SELECTED EMBODIMENTS

Figure 1:
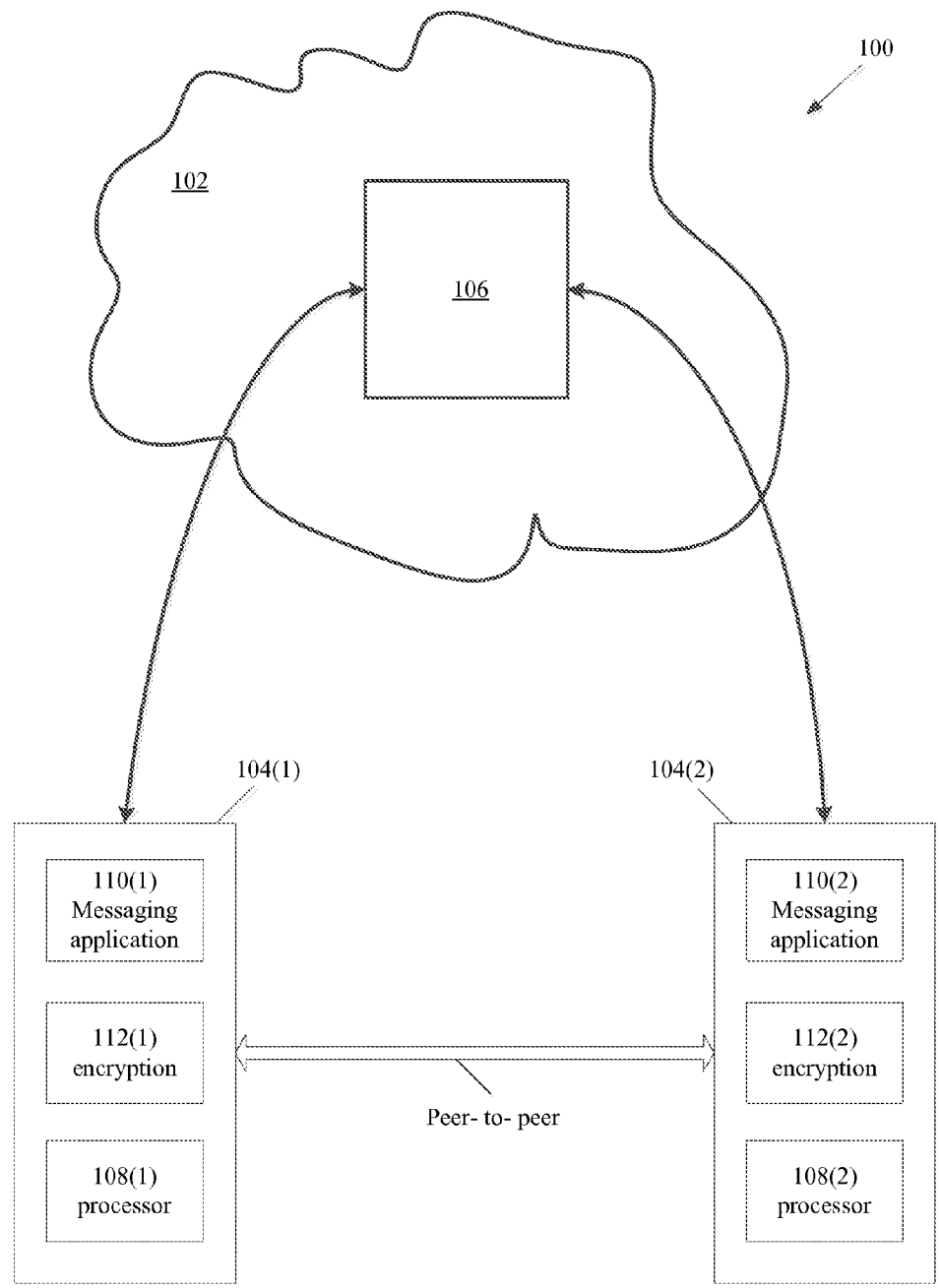
FIG. 1 illustrates representative private messaging system in accordance with the described embodiments.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

The examples and embodiments provided below describe a private messaging system. Operations of the private messaging system can be performed by a server. Encrypted data can be stored on the server in a platform-agnostic manner by which it is meant that the server need only deal with unstructured data without regards to specific requirements of the data being stored. Furthermore, the server operates without performing substantially any encryption/decryption processes related to the private messaging. In this way, the private messaging system offloads most of the potentially complex computation involved in privacy control from the server to the client devices such that the server requires virtually no knowledge of the data being hosted. Therefore, segregating platform-agnostic data and minimal access control burden to the server, provides for the flexibility to build highly scalable servers. Since distributed data storage is well-understood and available, delivering messages in formats that require no server processing resources for interpretation allows even basic, out-of-the-box file servers to work as powerful platforms for secure high-performance message sharing. Another advantage of the private messaging system is that the encrypted data can be stored publicly on untrusted machines for caching purposes without exposing any sensitive information.

Using the secure messaging system, the server can receive and store at least a portion of a secure message from a first client device. The secure message can include an encrypted data portion and information identifying at least a recipient client device authorized to read the secure message. In one embodiment, a second client device can receive the secure message from the server. The second client device can read the secure message only if the identifying information indicates that the second client device is authorized to read the secure message.

In one embodiment, the data portion is encrypted using a symmetric encryption key and an identity of the recipient device is embodied as a group label formed at least in part of a public key associated with the recipient device authorized to read the private message. In one embodiment, the public key can be used to encrypt the symmetric encryption key. In one embodiment, the group label can be static and be bound to an access control list that embodies a definitive list of all devices authorized to read the private message. In order to assure authenticity, the group label can be signed using a private key associated with an author of the private message and hashed to provide the group label ensuring that the group label can be reproduced by the author and no one else. The group label can be uniquely associated with the access control list, and therefore an access control list membership status can be used to determine whether or not a device is authorized to read the private message. Generally, the group label can then be created using the information regarding the devices listed in the access control list.

When attempting to read the private message, the device can quickly evaluate the group label associated with the private message to determine if the public key associated with the device is present. If the group label has been previously evaluated by the device, then an access flag status, for example, can be quickly evaluated without actually checking the content of the group label to determine if the device is authorized or not to read the private message. However, if the group label has not been previously encountered by the device, then the access control list associated with the group label can be obtained (from a message repository, for example) and queried to determine if the public key associated with the device is listed in the access control list. If the public key associated with the device is deemed to be present in the access control list, then the device is granted access to the symmetric encryption key and is authorized to read the secure message.

In one aspect of the described embodiment, the encrypted data takes the form of a data file, the data file having a header portion and a data portion (or payload) encrypted using the symmetric encryption key. The header portion includes information that aids the device in determining whether or not the recipient device is authorized to read the encrypted data portion. The header portion can include information (such as a pointer) that points to the group label. The pointer can take the form of a memory location in a memory device, such as a cache memory, where data corresponding to the group label is stored. The pointer can take the form of a URL (Universal Resource Locator) that identifies a network device (such as a server computer) for storing the data corresponding to the group label. The information in the header can also include information used to identify an access control list associated with a particular group label.

These and other embodiments are discussed below with reference to FIGS. 1-11. However, those skilled in the art will readily appreciate that the detailed description given herein with respect to these figures is for explanatory purposes only and should not be construed as limiting.

FIG. 1 illustrates representative private messaging system 100 in accordance with the described embodiments. It should be noted that although messaging system 100 illustrates an implementation of secure messaging, the environment is merely exemplary. The features of secure messaging described herein are platform-independent such that the messaging techniques may be implemented on a variety of commercial computing platforms having a variety of processors, memory components, and various other components.

Messaging system 100 can include communication network 102 and any number of messaging devices 104. More generally speaking, messaging devices 104 can take the form of a multi-mode communication device by which it is meant that messaging device 104 can both author and send secure message in an authoring mode and receive and read secure messages in a reading mode. Communication network 102 can be implemented as any one or combination of a wide area network (WAN), a local area network (LAN), a wireless network, a public telephone network, an intranet, and the like. Communication network 102 can include network device 106. Network device 106 can be associated with a network address. Network device 106 can include data storage devices, server computers, or any device or service consistent with a cloud computing environment. Although shown as a single communication network, communication network 102 can be implemented using any type of network topology and any network communication protocol, and can be represented or otherwise implemented as a combination of two or more networks. For example, a digital network can include various hardwired and/or wireless links, routers, gateways, and so on to facilitate communication between the communication network 102 and representative messaging devices 104.

Messaging device 104 can be implemented in any number of embodiments to include a computing device, a mobile messaging device, an appliance device, a gaming system console, an entertainment system component, a cell phone, a tablet computer, a smartphone, and as any other type of messaging device that may be implemented in a messaging system. Messaging device 104 can also represent logical clients that may include a user at messaging device 104, other devices, and/or software applications that implement embodiments of secure instant messaging. Messaging device 104(1) and messaging device 104(2) can also configured for direct communication via a peer-to-peer network by which the messaging devices can exchange real-time communications, such as instant messages. The peer-to-peer network can be implemented as a separate and independent communication link from the communication network(s) 102. Additionally, the peer-to-peer network can be implemented using any type of network topology and any network communication protocol, and can be represented or otherwise implemented as a combination of two or more networks.

Messaging device 104 can include one or more processors 108 (e.g., any of microprocessors, controllers, and the like) which process various computer executable instructions to control the operation of messaging device 104, to communicate with other electronic and computing devices, and to implement embodiments of secure messaging. Messaging devices 104 can also include messaging application 110 that is executable by processor 108. For example, messaging device 104(1) can participate in a messaging session with another messaging device, such as messaging device 104(2). The messaging session can be peer-to-peer by way of the peer-to-peer network or by way of communication network 102. Messaging application 110 provides that users at each of the respective messaging devices 104, when participating in a messaging session, can communicate with each other by way of instant text messages, multi-media exchange, voice communications, avatars (e.g., visual representations), and the like. The messages (or other communications) are exchanged via the peer-to-peer network as well as via communication network 102 in real-time. It should be noted, however, that even in real time, the messages can experience delayed delivery when the messages are logged or when a recipient messaging device is off-line or otherwise unavailable.

Messaging devices 104 can include encryption module 112 to implement embodiments of secure messaging as described further below. It should be noted that, although messaging application 110 and encryption module 112 are each shown as independent applications, messaging application 110 can be implemented to include encryption module 112 to form a multi-functional component of the messaging device 104. Further, although each of the messaging application 110 and the encryption module 112 in messaging device 104 is illustrated and described as a single application configured to implement embodiments of secure messaging, either or both of the messaging application 110 and the encryption module 112 can be implemented as several component applications distributed so each can perform one or more functions in messaging device 104 and/or in a messaging system 100.

Figure 2:
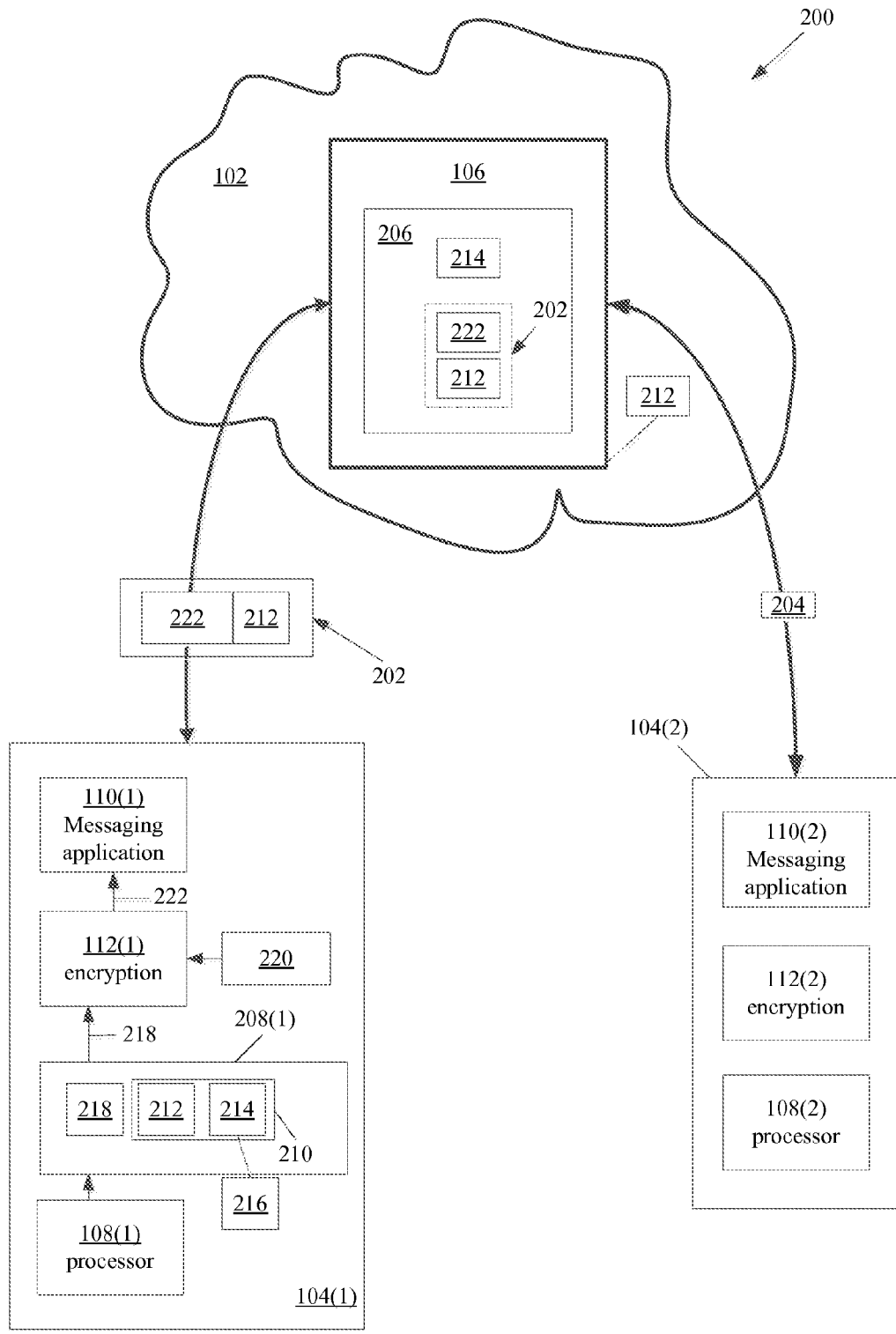
FIG. 2 illustrates an exemplary messaging system in which embodiments of secure messaging can be implemented that also includes components of messaging system shown in FIG. 1.

FIG. 2 illustrates an exemplary messaging system 200 in which embodiments of secure messaging can be implemented that also includes components of messaging system 100 shown in FIG. 1. In system 200, the messaging devices 104 each include the respective messaging applications 110 and the encryption modules 112 as described above with reference to FIG. 1. Messaging application 110(1) at messaging device 104(1) includes and/or generates various communications and data 202, and similarly, the messaging application 110(2) includes and/or generates various communications and data 204. In one embodiment, data 202 can take the form of secure data 202 that can be transferred from messaging device 104(1) to communication network 102. In one embodiment, data 202 can be stored in data repository 206 associated with network device 106. Data repository 206 can provide data storage and retrieval services for messaging system 200 by storing secured and unsecured data in a platform agnostic manner. By platform agnostic, it is meant that data repository 206 does not require information related to the structure or other particulars of data 202 in order to provide the requisite storage services for messaging system 200. Data repository 206 can also be in communication with messaging device 104(2) in such a way that messaging device 104(2) can interact with data repository 206 to receive data 202 stored therein. Data 202 (and 204) can take any number of forms or be any one or combination of an instant message, a file transfer, an image transfer, a text-based communication, an audio communication, a video communication, or an audio/video communication, any of which may be communicated as an encrypted or otherwise secure communication via communication network 102.

Messaging devices 104 can include memory 208 that can store contact information 210 for each respective messaging device 104. In one embodiment, contact information 210 can include identification of a group of messaging devices (recipients) authorized to read a secure message. In one embodiment, the identities of the messaging devices authorized to read the secure message can be embodied as group label (GL) 212 uniquely bound to access control list (ACL) 214. Group label 212 can take the form a string of text (or other similar identifier) that uniquely identifies the group of authorized recipient devices listed in access control list 214. Generally, group label 212 is configured in such a way that the message author, and only the message author, can reliably and quickly reproduce group label 212. This can be accomplished in a particular embodiment by signing with the author's private key and then hashing the signature using a cryptographic hash function (such as SHA-512). In this way, group label 212 takes the form of a compact and unique identifier for the set of recipient devices that can only be reproduced by the message author in a reliable and efficient manner. Group label 212 can reside in or be associated with data repository 206 and can be accessible to both messaging device 104(1) and 104(2) via communication network 102. In an instant messaging environment, both group label 212 and access control list 214 can reside in or be associated with messaging device 104(1) and/or messaging device 104(2). In this way, secure messages 202/204 can be passed between messaging devices 104(1) and 104(2) using peer-to-peer network independent of communication network 102.

Access control list 214 is a publicly available list that list devices authorized to read a secure message. In one embodiment, access control list 214 can be created by generating a random symmetric encryption key (size such as AES 256 bits) that can be used to encrypt the message and any relevant metadata. A copy of the symmetric encryption key is encrypted with an authorized recipient device's public key using, for example, randomly padded RSA using PKCS #1, for example or OAEP to prevent collision based brute forcing. The encrypted copies of the symmetric encryption key can then be stored in a suitable list container format without being associated with any identifiable information. The group label can be stored in the same container and signed with the message author's private key for authentication purposes. In this way, access control list 214 is formed of a list of keys each being one symmetric encryption key encrypted several times over for all authorized recipient devices. It should be noted that the identity of the authorized message recipients cannot be revealed through access control list 214 but access control list 214 can nonetheless be easily reused for subsequent messages to the same group of recipients. The message author can also added to the list of authorized recipients in order to maintain access to the secure message once it has been posted.

In some instances, a double blind variation of access control list 214 can be formed by foregoing the use of a group label derived from the identities of the authorized recipients and using instead a constant arbitrary textual label (such as "Friends"). Since there is no label tied to a fixed set of recipients, the message author can rewrite the double blind access control list on the server to dynamically add new recipients. Therefore, when the double blind access control list is being used, a "clear" unpublished access control list 216 can be created listing all authorized recipient devices. In this way, even though the identity of all of the double blind access control list are unavailable even to the message author, the message author can rely on clear access control list 216 to identify all authorized recipients in the group associated with double blind access control list.

Using the double blind variation of the access control list precludes the performance benefits accrued with client side caching and reuse of access control list 214, however, the dynamic nature of the double blind access control list allows for implementation of lists where new users can join an existing group and receive all prior and future messages. However, in order to remove a member from the double blind access control list, a new double blind access control list must be regenerated with a new symmetric key and re-encrypting all issued posts to prevent access by the removed member. In yet another variation, the access control list can be generated and used only once and be associated with a randomly generated group label. In this variation, the access control list is both double-blind and low performance but can be useful in those situations where traffic analysis is a recognized security threat.

Only those messaging devices listed as a member in access control list 214, and therefore considered to be authorized, can decrypt secure message 202. In one embodiment, once a messaging device has determined that it is a member of a particular access control list, the messaging device can flag the group label associated with the particular access control list with, for example, an accept flag. In this way, the accept flag alone can be used as a marker to indicate that the secure message associated with the flagged group label can be read by the messaging device thereby greatly saving both time and computational resources. On the other hand, once the messaging device has determined that is it not a member of the particular access control list, then the group label associated with the access control list can be appropriately flagged as, for example, not accept. In this way, messaging devices can easily determine whether to skip over and not even attempt to decrypt messages based solely a group label flag status. For example, if a group label flag status associated with a secure message indicates that a particular messaging device is not an authorized recipient messaging device with respect to the secure message, then no further processing by the messaging device is needed.

However, in those cases where a particular group label is not flagged (indicating that the messaging device has not yet evaluated the group label) the messaging device can query the access control list associated with the group label. The query can ascertain access control list membership status of the messaging device by determining if the messaging device is or is not a member of the access control list and as a result the group label flag can be set appropriately. It should be noted that an advantage of messaging system 200 includes the fact that the same symmetric encryption key can be re-used for messages sent to the same groups) of recipients. In other words, for a given set of recipients A that is equal to a set of recipients B, the group labels for recipients A and B will be cryptographically equal since the group labels are sorted hashes. Using the same symmetric encryption key for all messages bound for the same set of recipients allows for efficient caching and fast message decryption.

Figure 3:
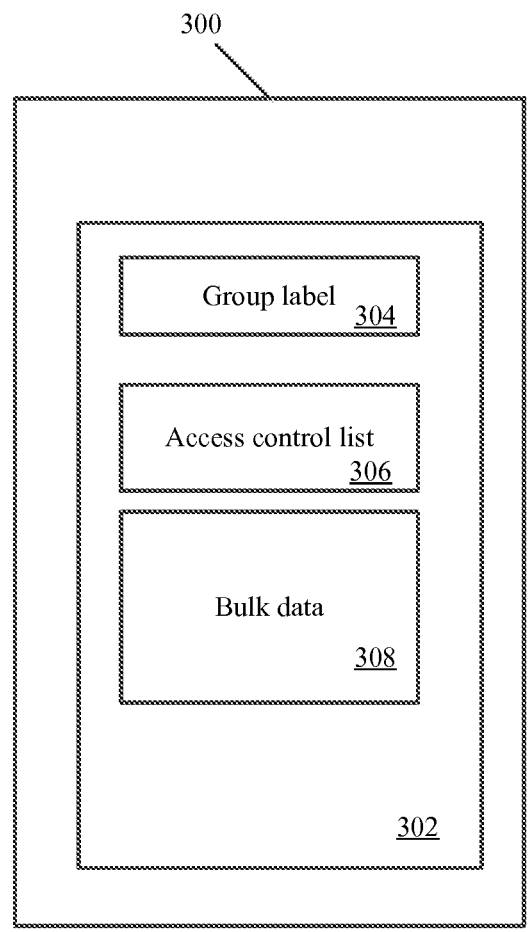
FIG. 3 shows representative portable storage device in the form of, for example, a FLASH memory in the form of what is commonly referred to as a "thumb drive".

In another embodiment, a portable data storage device can be used to support private messaging. For example, FIG. 3 shows representative portable storage device 300 in the form of, for example, a FLASH memory in the form of what is commonly referred to as a "thumb drive". In this arrangement, portable storage device 300 can interface with messaging device 104(1) in any suitable manner to retrieve and store secure message 302 that can include group label 304, and associated access control list 306 and encrypted data 308. In this way, secure message 302 can be physically transported in a safe and secure manner in such a way that only those messaging devices that can read group label 304 or is a member of access control list 306 can decrypt data 308 to read secure message 302. This embodiment is particularly well suited for those situations where a secure message is made physically available to a number of individuals but where only those designated as recipients can read the secure message, not all of whom are allowed to read secure message 302.

Referring back to FIG. 2, messaging device 104(1) can author secure message 202 in a message authoring operation using messaging application 110(1), encryption module 112(1) and, optionally, data stored in memory 208(1). Secure message 202 can be authored by receiving (unsecured/clear) data 218 from memory 208(1). Data 218 can be, for example, a message intended for a specific (group of) recipient message device 104(2). Data 218 can include video data, text data, audio data and so forth. Data 218 can be encrypted using encryption module 112(1). Encryption module 112(1) can encrypt data 218 using any number of available and well known encryption protocols such as symmetric encryption key encryption, public-private key encryption, and so on. In this example, encryption module 112(1) can use symmetric encryption key 220 to generate encrypted data 222. In order to author a secure message, a group of messaging devices is identified to receive the secure message. If the group is an established group known to the author, then the group label associated with the group is identified and a symmetric encryption key used to encrypt the secure message is obtained. The symmetric encryption key can then be used to generate encrypted data 222. However, if no group label is available (if a new group of recipient devices for example), and then a new access control list is generated for the group and bound to a group label that uniquely identifies the recipient devices.

In one embodiment, messaging device 104(1) can post secure message 202 as encrypted data 222 only to data repository 206 separate from group label 212. In another embodiment, messaging device 104(1) can post secure message 202 by inserting encrypted data 222 and group label 212 into a container that is then forwarded to data repository 206. In any case, messaging device 104(2) can query group label 212 to quickly determine those messages (if any) stored in data repository 206 for which messaging device 104(2) is authorized recipient device and skip over those messages that messaging device 104(2) is not an authorized recipient.

In another embodiment, a lightweight implementation of private messaging system 200 can include group label 212 residing in or being associated with network device 106 separate from data received from messaging device 104(1). For example, group label 212 can reside in communication network 102 separate from but otherwise associated with secure message 202. For example, secure message 202 can take the form of a data file along the lines shown in FIG. 3 having a header portion and payload, or data, portion. The data portion of data file can be encrypted while the header portion can remain open. In this scenario, the encrypted data portion can be stored in a storage device separate from header portion since the header portion can include group label 212 or an indication (such as a pointer) of a location where group label 212 is stored. Group label 212 can also provide an indication of a location where symmetric encryption key 220 is stored in those situations where messaging device 104(2) is able to read group label 212. For example, the header portion can include a network identifier (such as a Universal Resource Locator, or URL) identifying a network device on which group label 212 resides.

Figure 4:
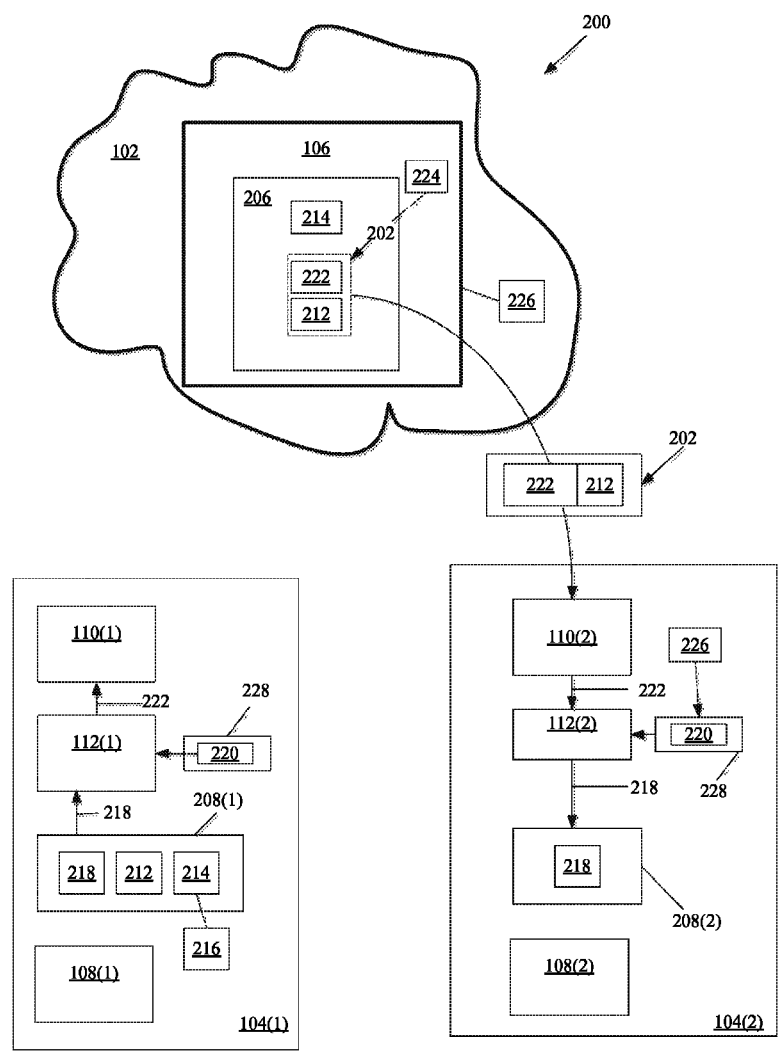
FIG. 4 illustrates messaging system in which messaging device 104(2) is attempting to read secure message in a reading operation in accordance with the described embodiments

FIG. 4 illustrates messaging system 200 in which messaging device 104(2) is performing a read operation in accordance with the described embodiments. Initially, messaging device 104(2) can determine if secure message 202 is available to read by, for example, evaluating status flag 224 posted by data depository 206 (or network 102) indicating the presence of secured message 202. Once messaging device 104(2) has determined that secure message 202 is present in data depository 206, a determination can be made if messaging device 104(2) is a recipient device able to read secure message 202. In one embodiment, the determination can be made by evaluating group label 212 associated with secure message 202. Messaging device 104(2) can evaluate group label 212 by checking cache 226 of group labels previously seen by messaging device 104(2). It should be noted that cache 226 can reside in network 102. In some cases, cache 226 can reside in messaging device 104(2) thereby reducing signals between messaging device 104(2) and network 102 and overall network traffic. This reduction in network traffic can be advantageous to the performance of private messaging system 200 during times of reduced available bandwidth.

If group label 212 is stored in cache 226, then messaging device 104(2) can determine if it is an authorized recipient device using the previous evaluation of group label 212 by messaging device 104(2). For example, if the previous evaluation indicates that messaging device 104(2) is an authorized recipient device, (i.e., is a member of the access control list 214) then messaging device 104(2) can access symmetric encryption key 220 associated with group label 212. Symmetric encryption key 220 can, in turn, be used to decrypt and read secure message 202. If group label 212 associated with secure message 202 is not included in cache 226, then messaging device 104(2) can query access control list 214 (which can be located local to messaging device 104(2) or in network 102) associated with group label 212 to determine whether or not messaging device 104(2) is a member of access control list 214. If it is determined that messaging device 104(2) is a member of access control list 214, messaging device 104(2) can be granted access to use symmetric encryption key 220 in order to read secure message 202. Symmetric encryption key 220 used to decrypt secure message 202 can be obtained in any number of ways. For example, symmetric encryption key 220 can be stored in symmetric encryption key repository 228 located in any number of appropriate locations accessible by messaging device 104(2). In one scenario, symmetric encryption key repository 228 can be associated with network device 106 or be local to messaging device 104(2) in which case messaging device 104(2) can obtain symmetric encryption key 220 directly from the symmetric encryption key repository 228 without accessing network 102.

There are a number of techniques that messaging device 104(2) can use to quickly check the contents of cache 226 for its membership status in access control list 214. In one embodiment, a flag status associated with group label 212 associated with secure message 202 can be used to quickly provide messaging device 104(2) with the requisite information. For example, group label 212 can have a flag status set to a first flag status indicating the messaging device 104(2) is a member of access control list 214 and is therefore a recipient device and has access to symmetric encryption key 220. Symmetric encryption key 220 can then be used to decrypt encrypted data 222 in secure message 202 by encryption module 112(2). On the other hand, a second flag status can indicate that messaging device 104(2) in not a member of access control list 214 and is not a recipient device and therefore does not have access to symmetric encryption key 220. As a result messaging device 104(2) is not granted access to symmetric encryption key 220 and therefore cannot read secure message 202 and it can be skipped.

In another scenario if cache 226 is either not available or group label 212 is not stored therein, then messaging device 104(2) can obtain symmetric encryption key 220 from access control list 214 directly. In this scenario, messaging device 104(2) can locate an entry (if any) associated with messaging device 104(2) in access control list 214 using any number of search algorithms. It should be noted that for access control lists having a large number of members, searching for a key in the access control list can be optimized by sorting the keys when the access control list is generated using standard hash table techniques to provide a best guess index. Messaging device 104(2) can decrypt entries within access control list 214 to determine if messaging device 104(2) has access to the symmetric encryption key used to decrypt the secure message 102. If the decryption is successful, then the symmetric encryption key corresponding to the location in the access control list can be stored in a cache memory, such as symmetric encryption key repository 228, for example. If, however, the decryption fails for all keys in the access control list, then the access control list can be flagged as no access for messaging device 104(2) for secure message 202. In any case, once messaging device 104(2) is granted access and acquires symmetric encryption key 220, encryption module 112(2) can use symmetric encryption key 220 to decrypt encrypted data 222 thereby allowing messaging device 104(2) to read secure message 202.

From a strictly server side viewpoint, network device 106 acts only as a data store and does not provide any computer resources for encryption or decryption of secure message 202. In this regard, storage services provided by network device 106 can be platform agnostic in that the knowledge of the particular form or format of the data is not required for network device 106 to provide the requisite storage services. For example, in the context of private messaging system 100, network device 106 simply receives secure message 202 from messaging device 104(1). Network device 106 then stores relevant portions of secure message 202 until such time as required by messaging device 104(2) to forward at least an encrypted portion of secure message 202. In some cases, network device 102 can provide in addition to a data storage service, a stored secured message notification service that provides notification to an interested messaging device that secured data (such as secure message 202) has been posted to network device 106. For example, when messaging device 104(1) forwards secure message 202 to data repository 206, communication network 102 can post flag 224 described above.

Figure 5:
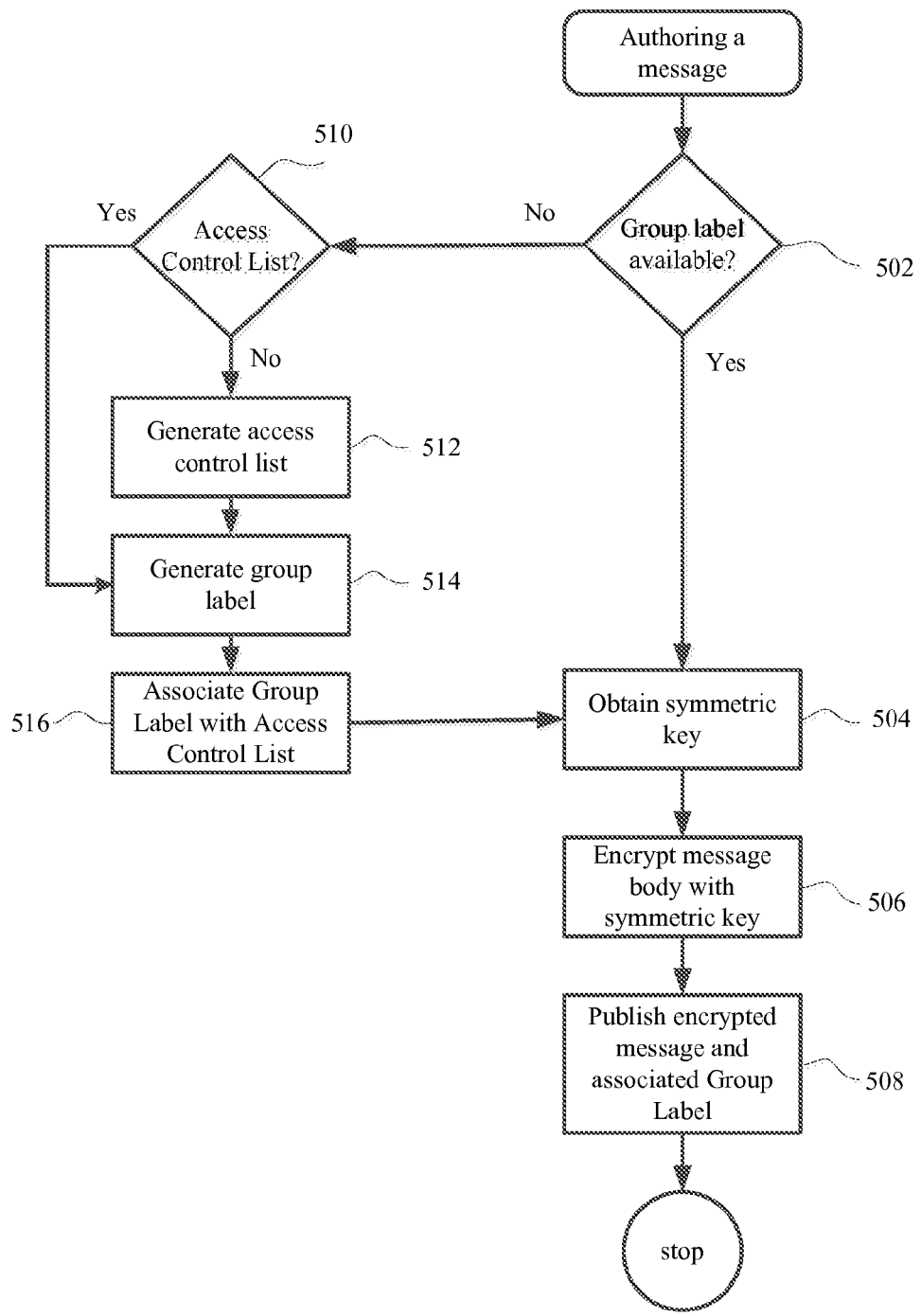
FIG. 5 illustrates a data structure for representative group label in accordance with the described embodiments.

FIG. 5 shows a representative flowchart detailing process 500 for client device authoring a secure message in accordance with the described embodiments. It should be noted that process 500 is a process that can be considered a client side process by which it is meant that process 500 is performed using only client device computing resources. For example, if the client device is a portable communication device such as an iPhone smartphone manufactured by Apple, Inc. of Cupertino, Calif. then substantially all processes related to encrypting and decrypting the secure message can be executed entirely on the smartphone platform. In this way, network traffic related to encryption processes can be kept to a minimum.

Accordingly, process 500 can begin at 502 by a client device determining if information relating to an identity of a recipient device is available. It should be noted that although it is understood that an individual user is likely (but not the only possibility) the entity driving the private communication, the identity information points to the client device and not an individual. That having been said, the identity information can be embodied as a group label. If it is determined that the group label is available indicating those client devices authorized to read the secure message, then the authoring client device is granted access to a symmetric encryption key associated with the group label at 504. The symmetric encryption key can be used by the authoring client device to encrypt a data portion (also referred to as a message body) at 506. The encrypted message is then published at 508 to a network and made available to any client device that is a member of the network but can only be read by those network members identified in the group list. In one embodiment, the group label is combined with the encrypted message body to form the secure message. This configuration is well suited for applications whereby the secure message is physically transported using a portable data storage device such as a non-volatile memory based thumb drive in which case the encrypted message and the group label identifying the authorized recipients are maintained in a single container. Returning to 502, if on the other hand, it is determined that the group label is not available, then a determination is made at 510 if an access control list for the group of recipient devices is available. If the access control list is not available, then the access control list is generated at 512 and a group label is generated at 514 and associated with the access control list at 516 and control is passed to 504. If on the other hand at 510, the access control list is available, then control is passed directly to 514 where the group label is generated and associated with the access control list at 516.

Figure 6:
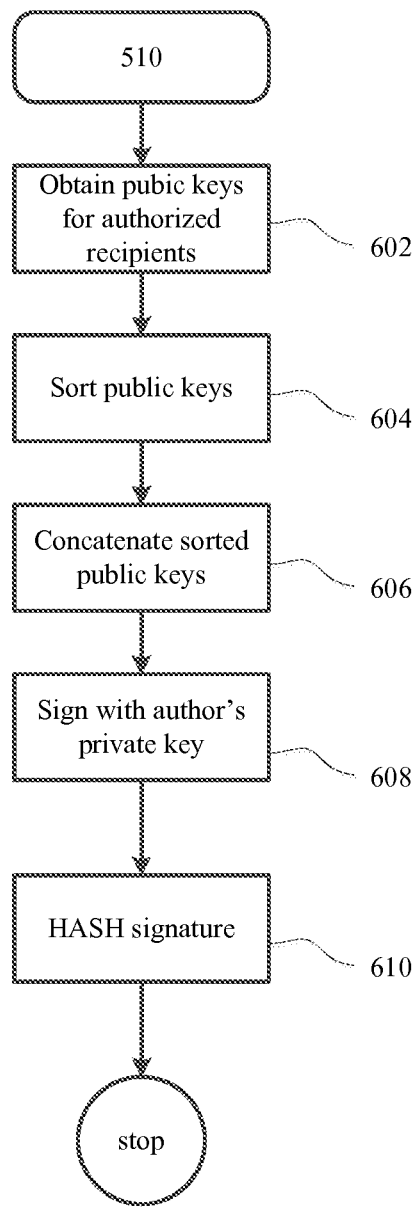
FIG. 6 illustrates a data structure for representative access control list in accordance with the described embodiments.

FIG. 6 shows a flowchart detailing process 600 for generating a group label. In particular process 600 can be a particular implementation of operation 510 shown in FIG. 5 and described above. In one embodiment, process 600 can begin at 602 by obtaining public keys associated with all recipient devices authorized to read the private message. At 604, the public keys obtained at 602 are sorted and concatenated at 606. At 608, the list of concatenated public keys is signed with a private key associated with an author of the message and a hash operation is performed on the signature at 610. In this way, only the author of the message has the ability to alter the content of the group label by adding or removing listed members of the group label.

Figure 7:
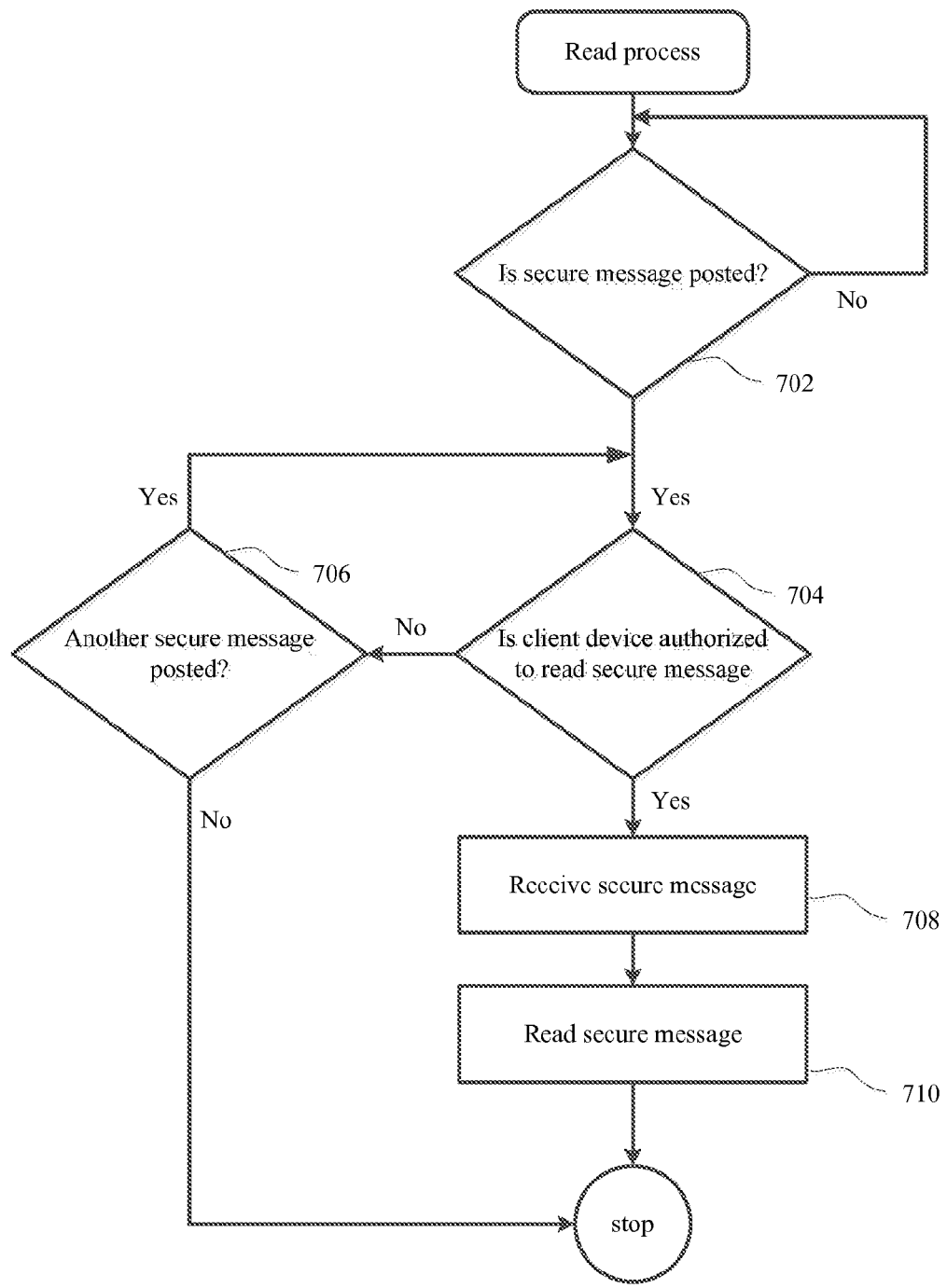
FIG. 7 shows a representative flowchart detailing process for authoring a secure message in accordance with the described embodiments.

FIG. 7 shows a representative flowchart detailing process 700 for reading a secure message in accordance with the described embodiments. Process 700 can be carried out by any client device in communication with a storage device in which a secure message is posted. In those situations where the private message system utilizes a non-server computing environment, such as a peer-to-peer network, then the secure message can be posted at a first (sending) client device in communication directly with at least a second (receiving) client device. However, only for sake of simplicity, a server type communication network is presumed. Accordingly, at 702, a determination is made by at least one client device, other than the authoring client device, that a secure message is posted. The determination can be carried out in any number of different ways. For example, a storage device at which the secure message is stored can post a flag or other such signal indicating that the secure message has been posted and is stored therein. In other embodiments, the authoring client device can post a signal indicating that the secure message has been posted and all interested client devices other than the authoring client device can attempt to read the secure message stored at a location indicated by the authoring client device.

In any case, once it has been determined that the secure message has been posted, then at 704 a determination is made if a client device is authorized to read the posted secure message. Authorization can be determined using the group label associated with the secure message. For example, if the client device has previously encountered the group label, then the client device will know (as long as the client device is still authorized) based upon the previous encounter whether or not it is a member of the group allowed to read the secure message. However, in some instances the group label may not be available in which case; the client device can query the access control list associated with the secure message to determine the authorization status of the client device. For example, if a public key associated with the client device is embodied in the access control list, then the client device is authorized to read the secure message. If the client device determines that it is not authorized to read the secure message and if at 706 it is determined that there are no other secure messages, then process 700 can end. If on the other hand it is determined at 706 that there are additional secure messages, then control is passed back to 704.

Returning back to 704, if it has been determined that the client device is authorized to read the secure message, then at 708, the secure message is received at the client device and the secure message is read at 710. In one embodiment, the client device can use a data key (such as a symmetric encryption key) to unlock the secure message. For example, if the a message is encrypted using a symmetric encryption key, then the secure message can be read using the symmetric encryption key obtained from the access control list or a cache of symmetric encryption keys made available to authorized client devices.

Figure 8:
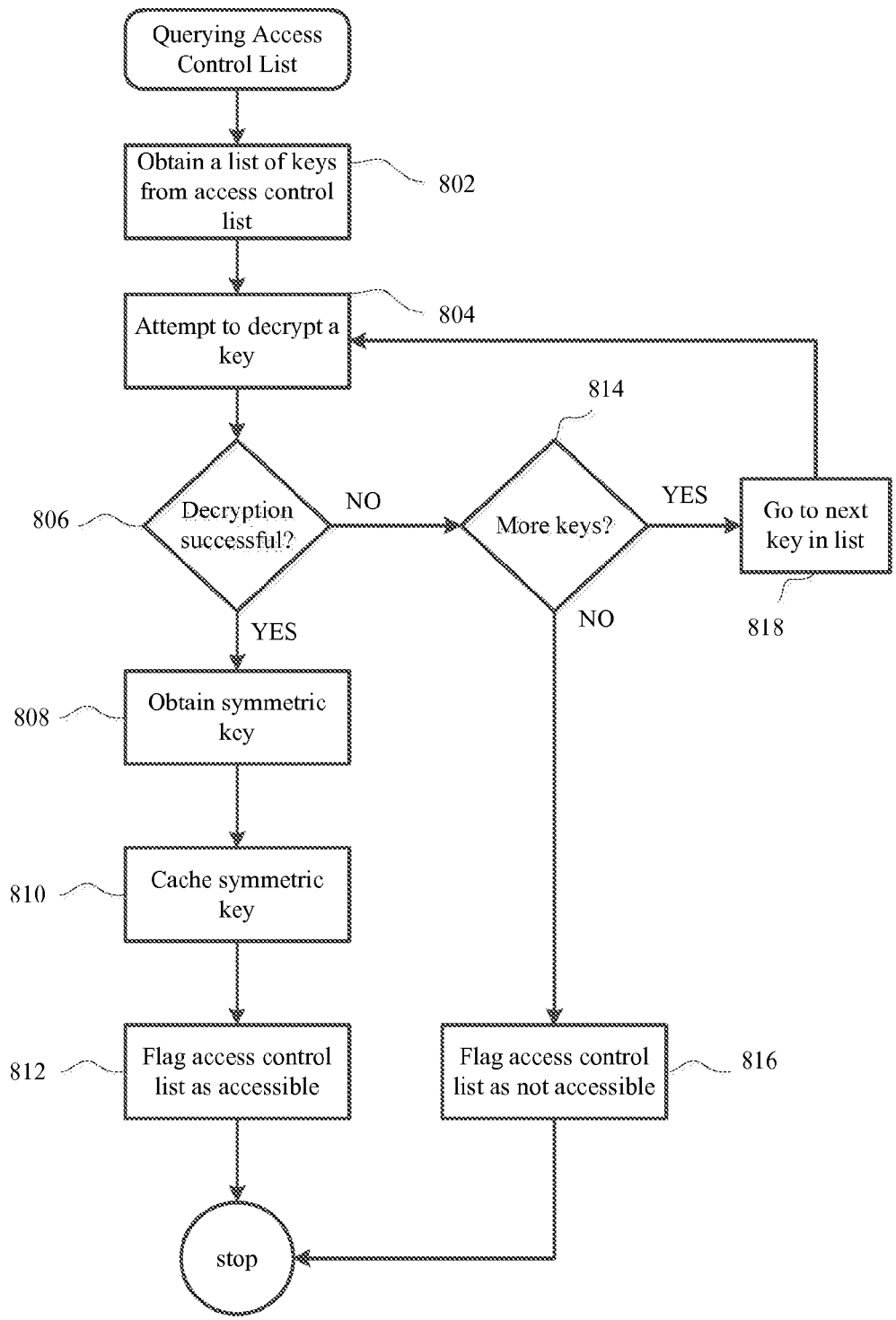
FIG. 8 shows a representative flowchart detailing process for reading a secure message in accordance with the described embodiments.

FIG. 8 shows a flowchart detailing process 800 for querying an access control list associated with a secure message to determine if the client device is authorized to read the secure message. Process 800 can be carried out by initially obtaining a list of keys from the access control list at 802. Each of the lists of keys can be associated with a particular client device and as such can indicate if the client device is authorized to read the secure message. At 804, an attempt is made to decrypt one of the keys and if determined at 806 to be successful, then a symmetric encryption key associated with the access control list is obtained at 808 and cached at 810. In one embodiment, the symmetric encryption key can be cached in symmetric encryption key repository made available to all messaging devices that have been listed in the access control list. Once the symmetric encryption key has been obtained, the access control list is flagged as being accessible at 812.

Returning to 806, if the decryption is determined to be not successful and if it is further determined at 814 that there are no additional keys, and then a not accessible flag is associated with the access control list at 816 and process 800 ends. If, however, it is determined at 814 that there are additional keys, then a next key in the list is obtained at 818 and control is passed back to 804 for additional processing.

Figure 9:
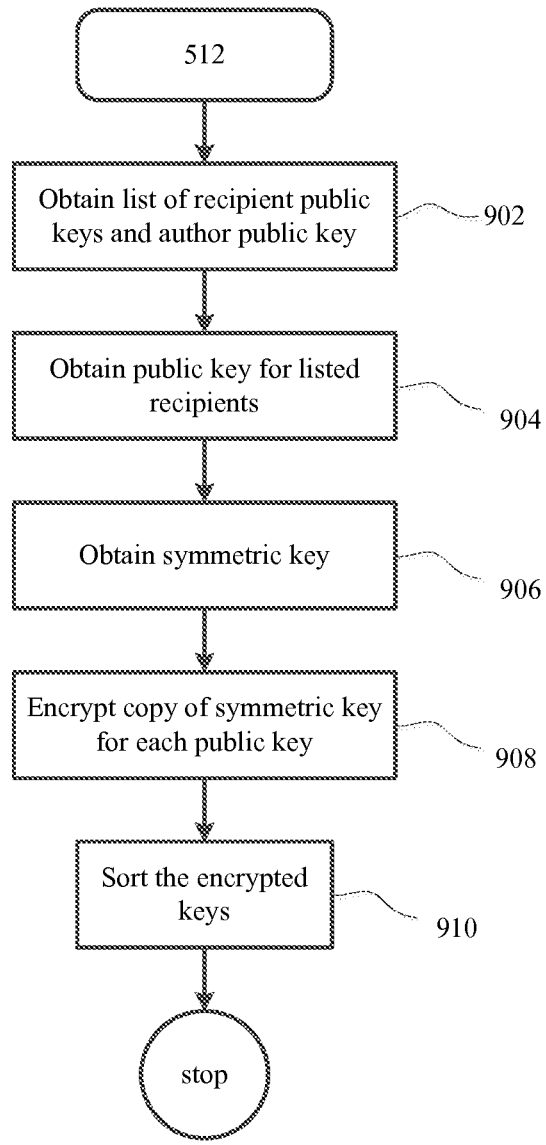
FIG. 9 shows a representative flowchart detailing process for forming a group label in accordance with the described embodiments.

FIG. 9 shows a representative flowchart detailing process 900 for generating an access control list as one implementation of step 512 shown in FIG. 5 in accordance with the described embodiments. Process 900 can begin at 902 by obtaining a list of recipient public keys and an authoring private key that in one embodiment can be embodied as a group label. The group label being a compact and unique identifier for a set of message recipients authorized to read the secure message that can only be reproduced by the message author. At 904, obtain a public key for each of the message recipients listed in the group label. At 906, a symmetric encryption key sized in accordance with, for example, AES 256 bits is obtained. At 908, a copy of the symmetric encryption key is encrypted for each of the public keys listed in the group label. In one embodiment, the message author is also added to the access control list to maintain the ability of the message author reading the secure message once it is posted. At 910, the encrypted copies of the symmetric encryption key are sorted and stored in a container format without any identifiable information. In one embodiment, the group label is stored in the container along with the access control list and the access control list is signed with the message author's private key to assure authenticity.

Figure 10:
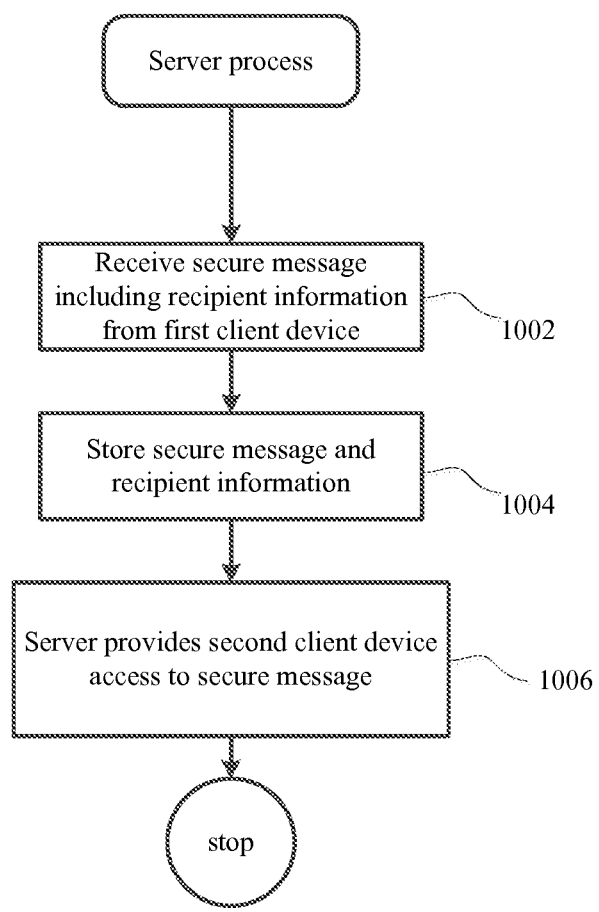
FIG. 10 shows a representative flowchart detailing process for forming an access control list in accordance with the described embodiments.

FIG. 10 shows a flowchart detailing a server side private messaging process 1000 in accordance with the described embodiments. Process 1000 can begin at 1002 by receiving a secure message at a server from a first client device. The secure message can include recipient information identifying all client devices authorized to read the secure message. The secure message can also include an encrypted data portion encrypted using a symmetric encryption key such that only those client devices granted access to the symmetric encryption key can decrypt and read the secure message.

At 1004, the secure message is stored at the server in a platform agnostic manner by which it is meant that the storage services provided by the server need only deal with unstructured data without regards to specific requirements of the data being stored. In one embodiment, the server can provide a notification that the secure message has been received and is available for interested client devices. At 1006, the server can provide access of the secure message and the identifying information to a second client device. The second client device can read the secure message only if the identifying information indicates that the second client device is authorized to read the secure message. In this way, the server is not required to use any server computer processing resources for encryption or decryption purposes and is only required to provide straightforward data storage services.

Figure 11:
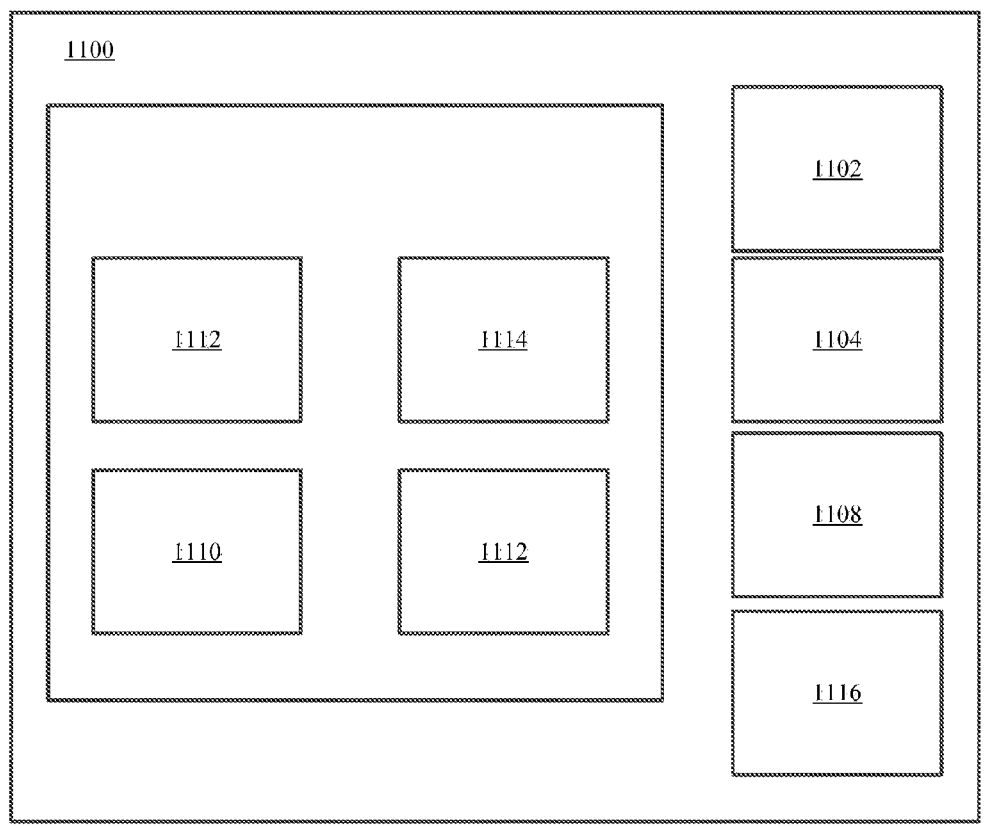
FIG. 11 illustrates various components of an exemplary computing and/or messaging device in which embodiments of secure instant messaging can be implemented.

FIG. 11 illustrates various components of an exemplary computing and/or messaging device 1100 in which embodiments of secure instant messaging can be implemented. Further, the computing and/or messaging device 600 can be implemented as any one or more of the messaging devices 104 described with reference to FIGS. 1-4. Computing and/or messaging device 1100 includes one or more media content inputs 1102 which may include Internet Protocol (IP) inputs over which streams of media content are received via an IP-based network, an intranet, or the Internet. Device 1100 further includes communication interface(s) 1104 which can be implemented as any one or more of a serial and/or parallel interface, a wireless interface, any type of network interface, a modem, and as any other type of communication interface. A wireless interface enables device 1100 to receive control input commands and other information from an input device, such as from remote control device, PDA (personal digital assistant), cellular phone, or from another infrared (IR), 802.11, Bluetooth, or similar RF input device.

A network interface provides a connection between the computing and/or messaging device 1100 and a communication network (e.g., communication networks 102 or peer-to-peer network) by which other electronic, computing, and messaging devices can communicate data with device 1100. Similarly, a serial and/or parallel interface provides for data communication directly between device 1100 and the other electronic, computing, and/or messaging devices. Computing and/or messaging device 1100 also includes one or more processors 1108 (e.g., any of microprocessors, controllers, and the like) which process various computer executable instructions to control the operation of device 1100, to communicate with other electronic and computing devices, and to implement embodiments of secure instant messaging. Device 1100 can be implemented with computer readable media 1110, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, solid state memory, and the like.

Computer readable media 1110 provides data storage mechanisms to store various information and/or data such as software applications and any other types of information and data related to operational aspects of the computing and/or messaging device 1100. For example, an operating system 1112 and/or other application programs 1114 can be maintained as software applications with the computer readable media 1110 and executed on processor(s) 1108 to implement embodiments of secure instant messaging. For example, when implemented as a messaging device computer readable media 1110 maintains a messaging application 110 and an encryption module 112 to implement embodiments of secure instant messaging.

The computing and/or messaging device 1100 also includes an audio and/or video output 1116 that provides audio and video to an audio rendering and/or display system that may be external or integrated with device 1100, or to other devices that process, display, and/or otherwise render audio, video, and display data. Although not shown, a user can interface with the device 1100 via any number of different input devices such as a keyboard and pointing device (e.g., a "mouse"). Other input devices may include a microphone, joystick, game pad, controller, serial port, scanner, touch sensitive device and/or any other type of input device that facilitates instant messaging.

Various aspects of the described embodiments can be implemented by software, hardware or a combination of hardware and software. The described embodiments can also be encoded as computer program code on a non-transitory computer readable medium. The non-transitory computer readable medium is any data storage device that can store data which can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A multi-mode communication device, comprising:
a communication interface arranged to send and receive information; and
a processor coupled with the communication interface, the processor arranged to control a secure messaging service at the communication device by creating a first secure message, the first secure message comprising:
a first secure data portion encrypted with a first symmetric encryption key, and
a first authorized recipient device specific information comprising a first group label bound to a first access control list, wherein the first group label is a hash of a public key of the first authorized recipient device and signed with a private key associated with the communication device, and the access control list includes the first symmetric encryption key encrypted with a public key of a first authorized recipient device;
wherein the processor is further configured the communication interface to post at least the first secure data portion to an external data storage device;
wherein a recipient device receives at least the first secure data portion of the first secure message and performs all decryption processing required to read the secure message, the decryption processing is performed if the recipient device is authorized to read the secure message in accordance with the first authorized recipient device information, and the recipient device determines authorization by a query of the authorized recipient device information; and
wherein the external data storage device stores at least the secure data portion in a platform agnostic manner and without performing any encryption and decryption processing of the secure data portion.

2. The multi-mode communication device as recited in claim 1, further comprising:
wherein the processor further to receive at least a portion of a second secure message authored by a second communication device from the external data storage device, the second secure message comprising:
a second secure data portion encrypted with a second symmetric encryption key, and
second authorized recipient device specific information comprising a second group label bound to a second access control list that includes the second symmetric encryption key encrypted with a public key of a second authorized recipient device.

3. The multi-mode communication device as recited in claim 2, wherein the communication device is authorized to read the second secure message only if the second access control list includes a public key associated with the communication device.

4. The multi-mode communication device as recited in claim 1, wherein the communication device uses the communication interface to send the first secure data portion and the first group label to the external data storage device separately.

5. The multi-mode communication device as recited in claim 2, wherein the first and the second symmetric encryption keys are equivalent.

6. The multi-mode communication device as recited in claim 1 wherein the decryption processing is performed only if the recipient device is authorized to read the secure message.

7. The multi-mode communication device as recited in claim 2, wherein the second group label is formed by hashing a public key of the communication device signed with a private key associated with the second communication device.

8. A method performed by a multi-mode communication device having a processor and a communication interface, the method comprising:
creating a secure message comprising a secure data portion encrypted by a first symmetric encryption key and device specific authorization information used by a recipient device to determine if the recipient device is authorized to read the secure message, the device specific authorization information including a first group label comprising a hash of a public key of the recipient device and signed with a private key associated with the communication device; and posting at least a portion of the secure message to an external data storage device using the communication interface, wherein the recipient device receives the secure message and performs substantially all decryption processing required to read the secure message if authorized in accordance with the device specific authorization information, wherein the recipient device determines authorization by querying the device specific authorization information for identification information associated with the recipient device, thereby permitting the external data storage device to store the secure message in a platform agnostic manner, and to store the secure message without performing any encryption and decryption processing of the secure message.

9. The method as recited in claim 8, further comprising:
receiving a second secure message at the communication interface, the second secure message comprising:
a second secure data portion encrypted with a second symmetric encryption key, and second authorization information used by, and specific to the communication device to determine if the communication device is authorized to read the second secure message.

10. The method as recited in claim 8, wherein the group label is bound to an access control list that includes the first symmetric encryption key encrypted with a public key of the recipient device authorized to read the secure message, querying the device specific authorization information includes querying the group label for the public key, and the recipient device performs decryption processing required to read the secure message only if authorized in accordance with the device specific authorization information.

11. The method as recited in claim 9, the second authorization information comprising:
a second group label bound to a second access control list that includes the second symmetric encryption key encrypted with a public key of the multi-mode communication device only if the multi-mode communication device is authorized to read the secure message.

12. The method as recited in claim 9, wherein the first and the second symmetric encryption keys are equivalent.

13. Non-transitory computer readable medium for storing instructions executable by a processor, to cause the processor to perform operations comprising:
storing at least a portion of a private message at a server, the private message comprising an data portion encrypted at an authoring client device, and device specific information identifying a recipient client device authorized to read the private message, the device specific information including a group label including a hash of a public key of the recipient client device and signed with a private key associated with the authoring client device; and
sending at least the encrypted data portion of the private message from the server to a client device, wherein the client device performs all decryption processing required to read the encrypted data portion if the client device is authorized, wherein no decryption processing related to the message is performed if the recipient client device is not authorized, and wherein the recipient client device is authorized by querying the server for the device specific identifying information, wherein the server stores the private message in a platform agnostic manner, and stores the private message without performing substantially any encryption or decryption related processing on the private message.

14. The computer readable medium as recited in claim 13, wherein the data portion is encrypted using a symmetric encryption key.

15. The computer readable medium as recited in claim 14, wherein querying the server for the device specific identifying information includes querying the group label for the public key associated with the authorized client device.

16. The computer readable medium as recited in claim 15, wherein the group label is bound to an access control list, the access control list comprising a key, the key formed by encrypting the symmetric encryption key with a public key associated with the authorized client device.

17. The computer readable medium as recited in claim 16, the access control list further comprising computer code for adding an encrypted key corresponding to the authoring client device to the access control list by encrypting the symmetric key with a public key associated with the authoring client device.

18. The multi-mode communication device as recited in claim 1, wherein the external data storage device stores at least the secure data portion in the platform agnostic manner, the platform agnostic manner being the external data storage device storing the secure data portion as unstructured data without regards to specific requirements of the secure data portion.

* * * * *